United States Patent
Zhu et al.

(10) Patent No.: US 10,275,683 B2
(45) Date of Patent: Apr. 30, 2019

(54) CLUSTERING-BASED PERSON RE-IDENTIFICATION

(71) Applicant: Cisco Technology, Inc., San Jose, CA (US)

(72) Inventors: Xiaoqing Zhu, Austin, TX (US); Rob Liston, Menlo Park, CA (US); John G. Apostolopoulos, Palo Alto, CA (US); Wai-tian Tan, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 91 days.

(21) Appl. No.: 15/409,821

(22) Filed: Jan. 19, 2017

(65) Prior Publication Data

US 2018/0204093 A1    Jul. 19, 2018

(51) Int. Cl.
*G06K 9/00* (2006.01)
*G06K 9/62* (2006.01)
*G06F 17/30* (2006.01)

(52) U.S. Cl.
CPC ....... *G06K 9/6218* (2013.01); *G06F 17/3028* (2013.01); *G06F 17/30256* (2013.01); *G06K 9/00771* (2013.01); *G06K 9/6215* (2013.01)

(58) Field of Classification Search
None
See application file for complete search history.

(56) References Cited

U.S. PATENT DOCUMENTS

| | | | |
|---|---|---|---|
| 9,171,013 B2 | 10/2015 | Gokturk et al. | |
| 9,239,967 B2 | 1/2016 | Liu et al. | |
| 9,448,704 B1 | 1/2016 | Belhumeur et al. | |
| 2010/0226584 A1* | 9/2010 | Weng | G06K 9/00221 382/225 |

(Continued)

FOREIGN PATENT DOCUMENTS

| | | |
|---|---|---|
| WO | 2015056024 A1 | 4/2015 |
| WO | 2015153211 A1 | 10/2015 |

OTHER PUBLICATIONS

Liao, et al., "Person Re-identification by Local Maximal Occurrence Representation and Metric Learning," IEEE International Conference on Computer Vision and Pattern Recognition (CVPR 2015), Jun. 2015, pp. 2197-2206.

(Continued)

*Primary Examiner* — Justin P. Misleh
(74) *Attorney, Agent, or Firm* — Edell, Shapiro & Finnan, LLC

(57) ABSTRACT

Presented herein are techniques for assignment of an identity to a group of captured images. A plurality of captured images that each include an image of at least one person are obtained. For each of the plurality of captured images, relational metrics indicating a relationship between the image of the person in a respective captured image and the images of the persons in each of the remaining plurality of captured images is calculated. Based on the relational metrics, a clustering process is performed to generate one or more clusters from the plurality of captured images. Each of (Continued)

the one or more clusters are associated with an identity of an identity database. The one or more clusters may each be associated with an existing identity of the identity database or an additional identity that is not yet present in the identity database.

20 Claims, 10 Drawing Sheets

(56) References Cited

U.S. PATENT DOCUMENTS

| | | | | |
|---|---|---|---|---|
| 2011/0235910 | A1* | 9/2011 | Soceanu | G06K 9/00295 |
| | | | | 382/173 |
| 2013/0343642 | A1 | 12/2013 | Kuo et al. | |
| 2015/0324631 | A1* | 11/2015 | Sandler | G06K 9/00228 |
| | | | | 382/118 |
| 2016/0034782 | A1* | 2/2016 | Nakano | G06K 9/00288 |
| | | | | 382/118 |
| 2016/0125232 | A1* | 5/2016 | Zhang | G06T 7/2046 |
| | | | | 382/103 |
| 2017/0228453 | A1* | 8/2017 | Gupta | G06F 17/30601 |

OTHER PUBLICATIONS

Li, et al., "DeepReID: Deep Filter Pairing Neural Network for Person Re-Identification," 2014 IEEE Conference on Computer Vision and Pattern Recognition (CVPR), Jun. 2014, 8 pages.

Lisanti, et al., "Person Re-Identification by Iterative Re-Weighted Sparse Ranking," IEEE Transactions on Pattern Analysis and Machine Intelligence, vol. 37, No. 8, Aug. 2015, pp. 1629-1642.

Zhang, et al., "Learning a Discriminative Null Space for Person Re-identification," 2016 IEEE Conference on Computer Vision and Pattern Recognition (CVPR), Jun. 2016, 10 pages.

Zheng, et al., "Person Re-identification in the Wild," arXiv:1604.02531v1 [cs.CV], Apr. 2016, 18 pages.

* cited by examiner

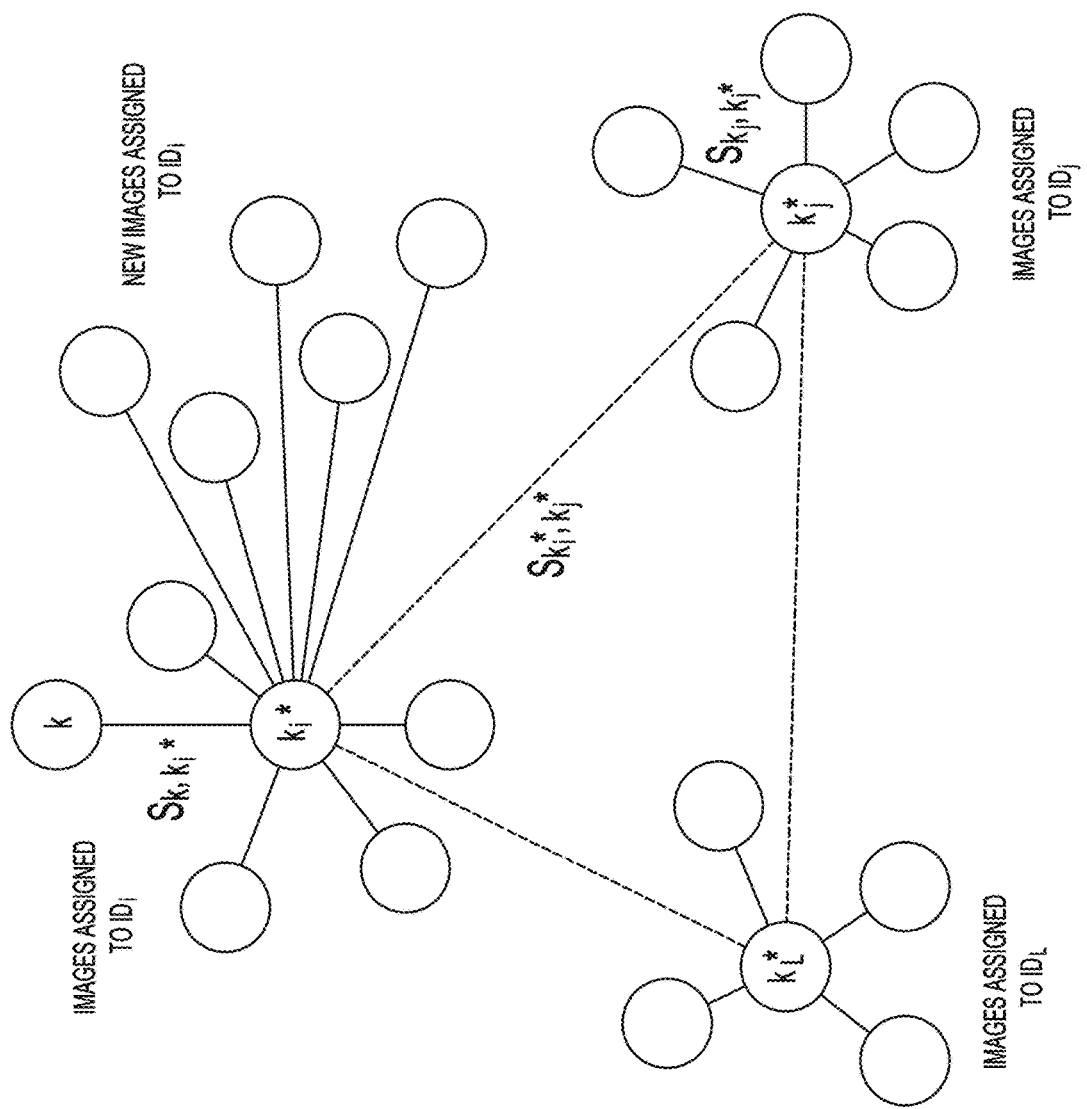

CLUSTERING-BASED PERSON RE-IDENTIFICATION

TECHNICAL FIELD

The present disclosure relates to person re-identification.

BACKGROUND

Person re-identification refers to techniques used for detecting and recognizing the same individual/person as he/she appears in different images captured at different times or locations. These images may be captured by different image capture devices or by the same image capture device over time. Person re-identification is a useful building block for many applications, including video surveillance, passenger flow monitoring in public transportation stations (e.g., airports), robotics, multimedia and forensics, retail customer behavior analytics, etc.

BRIEF DESCRIPTION OF THE DRAWINGS

FIG. 3A is a schematic diagram illustrating the calculation of an example utility function when assigning captured images to an existing identity, in accordance with example embodiments presented herein.

DESCRIPTION OF EXAMPLE EMBODIMENTS

Overview

Figure 1A:
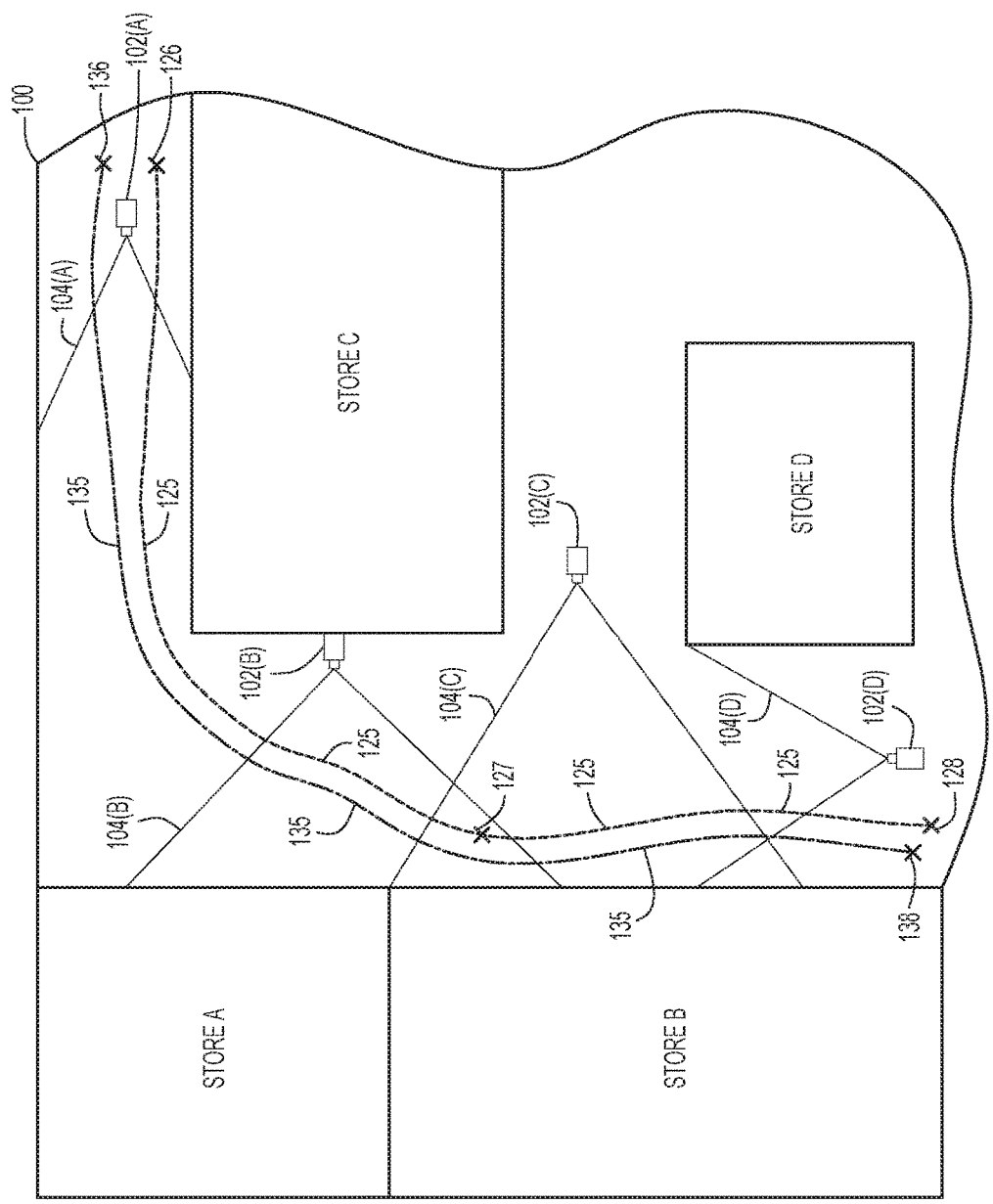
FIG. 1A is a block diagram of an arrangement in which the techniques presented herein may be implemented.

Presented herein are techniques that use clustering to facilitate assignment of an identity to a group of captured images. In one example, a plurality of captured images that each include an image of at least one person are obtained. For each of the plurality of captured images, relational metrics indicating a relationship between the image of the person in a respective captured image and the images of the persons in each of the remaining plurality of captured images is calculated. Based on the relational metrics, a clustering process is performed to generate one or more clusters from the plurality of captured images. Each of the one or more clusters are associated with an identity of an identity database stored in memory of one or more computing device. The one or more clusters may each be associated with an existing identity of the identity database or an additional identity that is not yet present in the identity database.

Detailed Description

Due, in part, to the rapid expansion of large-scale distributed multi-camera systems, person re-identification has become increasingly important for a number of different applications. Conventional person re-identification techniques generally focus on the use of appearance models (e.g., visual features) and metrics to compare two persons. However, when building a practical person re-identification system using, for example, live video feeds from multiple image capture devices (cameras), one key problem that remains to be solved is how to develop and dynamically update the database, sometimes referred to herein as a gallery, of recognized identities along with their sample image representations. With live video feeds from multiple cameras, it is likely that each person will appear in multiple frames in the captured video, and that multiple persons will be detected within the same time frame from different cameras. Presented herein are person re-identification techniques that use a clustering process/algorithm (e.g., incremental clustering) to assign either existing or new identities to detected persons (potentially from different cameras). As described further below, the clustering approach naturally lends to a method for pruning and updating example images of recognized identities. The techniques presented herein can further incorporate additional information, such as co-occurrence probability of identities, to enhance the person re-identification.

To facilitate description of the invention, the person re-identification techniques presented herein are generally described with reference to person re-identification in a video surveillance application using security cameras. However, it is to be appreciated that this specific application is merely illustrative and that the person re-identification techniques presented herein may be used in a number of other applications with other types of cameras (e.g., digital cameras, other video cameras (e.g., web cameras), streaming cameras, etc.) that capture still or moving images of one or more persons.

Figure 1B:
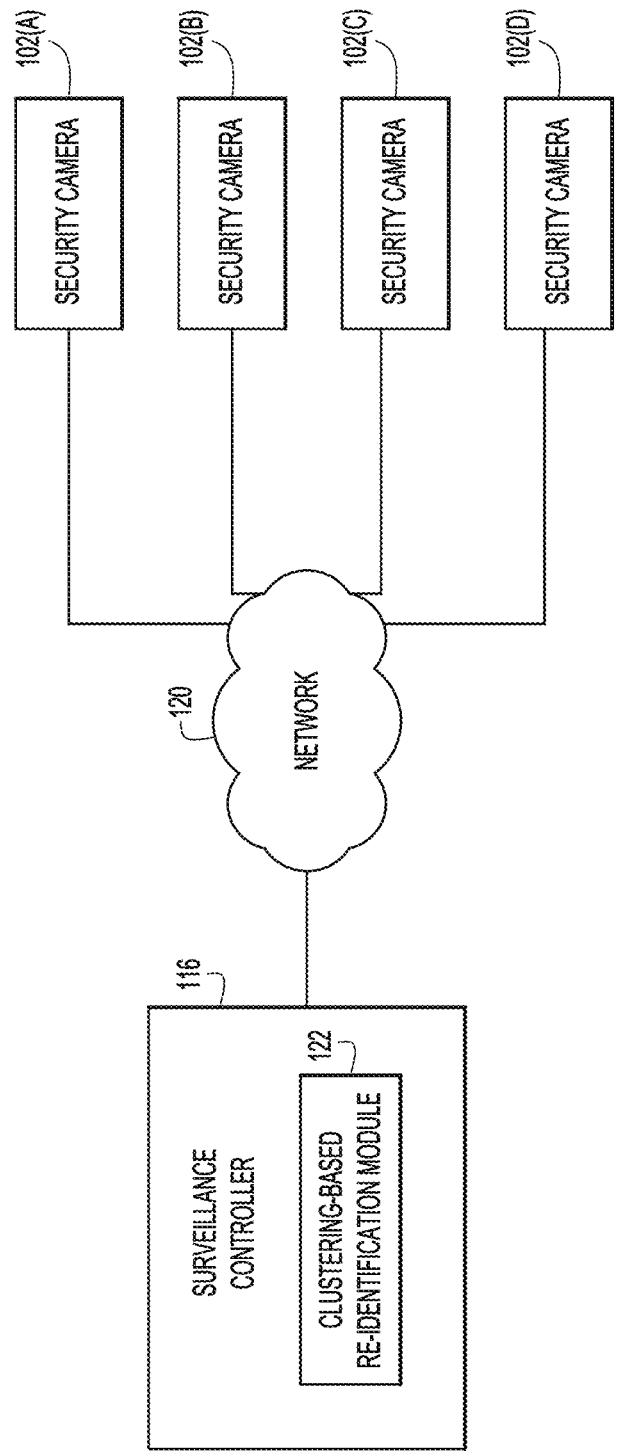
FIG. 1B is a functional block diagram of a video surveillance system, in accordance with example embodiments presented herein.

Referring first to FIG. 1A, shown is a region 100 of a physical location, such as a shopping center or mall, that is under video surveillance using a number of security cameras. FIG. 1B is a functional block diagram of a video surveillance system 110 that operates to monitor the region 100 of the physical location.

In the example of FIGS. 1A and 1B, the video surveillance system 110 includes four security cameras 102(A), 102(B), 102(C), and 102(D) that are each positioned to record video of corresponding physical sections/areas 104(A), 104(B), 104(C), and 104(D) within the region 100. As shown in FIG. 1B, the security cameras 102(A), 102(B), 102(C), and 102(D) are connected to a surveillance controller 116 via a network 120. The network 120 may be a wired or wireless network (e.g., local area network (LAN), wide area network (WAN), etc.) or combination thereof. The surveillance controller 116 includes a clustering-based re-identification module 122 that is configured to perform the person re-identification techniques presented herein. The security cameras 102(A), 102(B), 102(C), and 102(D) are configured to provide live video feeds of the corresponding areas 104(A), 104(B), 104(C), and 104(D) to the surveillance controller 116.

As noted above, as a person moves through the region 100, the person will likely appear in multiple frames of the videos captured by one or more of the security cameras 102(A), 102(B), 102(C), and 102(D). The person may also simultaneously appear in the videos captured by two or more of the security cameras 102(A), 102(B), 102(C), and 102(D) (i.e., the person is detected during the same time frame from different cameras). For example, shown in FIG. 1A is a track 125 of a person A as the person moves through region 100. In the example of FIG. 1A, person A enters the region 100 at a location 126 that is close to camera 102(A) and exits the region 100 at a location 128 that is close to camera 102(D). Between points 126 and 128, person A passes through all of the regions 104(A), 104(B), 104(C), and 104(D). As such, person A will, over time, appear in multiple frames of the video feeds captured by each of the security cameras 102(A), 102(B), 102(C), and 102(D). At location 127, person A will simultaneously appear in frames of the video feeds captured by both security camera 102(B) and 102(C). Person A may also simultaneously appear in the frames of the video feeds captured by other security cameras.

As noted above, as person A, moves through region 100, he/she will appear in different video feeds. These video feeds may be separated into groups of captured frames/images, sometimes referred to herein as "captured image groups." The techniques presented herein provide the ability to use a clustering process to assign an "identity" to captured image groups (i.e., to assign newly captured image groups to an existing or new "identity"). As used herein, an "identity" is an abstract linking of different image groups indicating that the same person is believed to appear in each of the linked image groups, without the requirement to indicate who the person is, in terms of name or other personal information.

More particularly, an image gallery/database may be generated to include a total of "images $\{y\_n|n=1, \ldots, N\}$ each associated with one of a number of existing "identities," given by Identity($y\_n$) (i.e., ID($y,n$)), respectively. In certain applications, there is a need to associate images of person A with either one of these existing identities or with a new identity of the image gallery.

In one form, the existing identity assignments in the identity database (i.e., the association of the N images with an identity) may be a clustering result of the N images (data points) using at least one "relational metric," such as a similarity or dissimilarity metric. For example, a similarity metric $s\_ij=f(y\_i, y\_j)$ can be used to indicate how likely images $y\_i$ and $y\_j$ belong to the same identity. For each identity, a representative image can be selected by choosing the image that has the highest total similarity metric scores for all other images belonging to the same identity.

It is to be appreciated that the use of a similarity metric is one example and that other techniques can be used in alternative arrangements. For example, a dissimilarity metric, such as a distance metric $d\_ij=g(y\_i, y\_j)$, can be defined, where a higher distance means that it is less likely that image i and image j belong to the same person. The representative image for a given cluster then corresponds to the one with the lowest average distance to all other images with the same identity. Merely for ease of illustration, the techniques presented herein are primarily described with reference use of similarity metric, even though these methods can be modified to accommodate the use of distance or other dissimilarity metrics as well.

In accordance with the techniques presented herein, at time t, given a total of M image probes (i.e., bounded boxes containing detected persons), a group of images defined as $\{x\_m|m=1, \ldots, M\}$ is obtained from one or more of the cameras. The techniques presented herein use a clustering process/algorithm (e.g., incremental clustering) to assign the group of images either to one of an existing identities in the image database (i.e., one of the identities ID($y,n$)) or to a new identity.

Figure 1C:
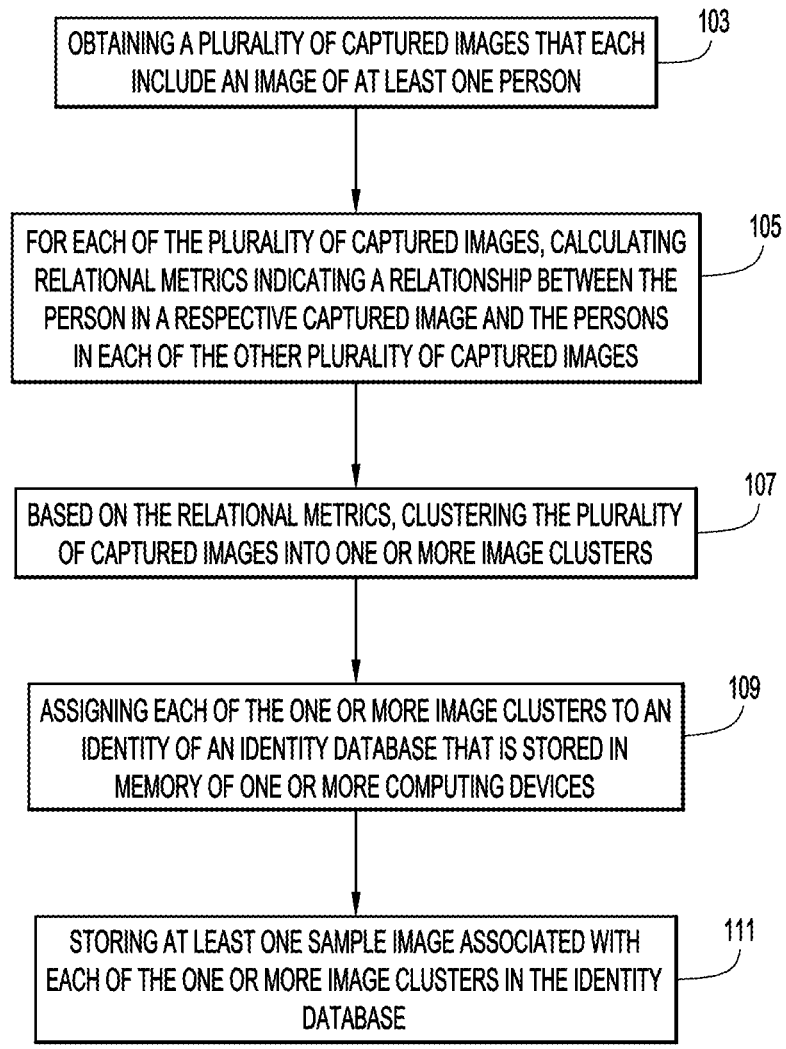
FIG. 1C is a high-level flowchart of a method, in accordance with embodiments presented herein.

FIG. 1C is a flowchart of a method 101 in accordance with embodiments presented herein. Method 101 begins at 103 where a plurality of captured images that each include an image of at least one person are obtained. At 105, for each of the plurality of captured images, relational metrics are calculated. The relational metrics indicate a relationship between the person in a respective captured image and the persons in each of the other of the (i.e., the remaining) plurality of captured images. At 107, based on the relational metrics, the plurality of captured images are clustered into one or more clusters (i.e., a clustering process is performed to generate one or more clusters from the plurality of captured images). At 109, each of the one or more clusters are assigned to (i.e., associated with) an identity of an identity database that is stored in memory of one or more computing devices. At 111, at least one sample image associated with each of the one or more clusters in the identity database is stored in the identity database (e.g., at a memory location corresponding to the identity with which the cluster has been associated).

Gallery Generation

As noted above, initially a gallery/database of identities, sometimes referred to herein as an "identity database," is generated. Within this identity database, various groups of images are associated with each of the various identities. In one example, the identity database is generated using a clustering process (algorithm).

For example, in one specific arrangement, a group of images are captured at a camera, such as camera 102(A) of FIG. 1A. For purposes of illustration, it is assumed that camera 102(A) captures a group of ten (10) images. In this example, the surveillance controller 116 receives the group of images and the clustering-based re-identification module 122 calculates similarity metrics (or dissimilarity metrics) between each pair of images. These similarity metrics, which are referred to herein as pairwise similarity metrics indicate the probability that the two images (forming the respective pair) are of the same person or not. In one form, the pairwise similarity metrics can be presented as a 10×10 matrix of metrics.

A clustering process is then executed given the pairwise similarity metrics, using one of several existing techniques such as k-means clustering, spectral clustering, affinity propagation, and so on. The clustering process operates to "cluster" the images with one another (i.e., determine how best to cluster the 10 data points (images) with one another). The result is one or more clusters of images, where each cluster indicates a different person. Stated differently, the clustering result will be either a single cluster (i.e., all images are the same person) or multiple clusters (e.g., the images represent multiple different persons).

The clustering result also selects a representative image for each "cluster." For example, in one specific implementation, a group of 10 sequential images are clustered into two clusters, the first cluster including the first 6 images, and the second cluster including the last 4 images. As a result, the first 6 images are associated with a first person and the last 4 images are associated a second person. A representative image for each cluster can also be selected. In this specific example, the 3rd image is selected as representative for a first identity (e.g., Identity 1) and the 9th image is selected as the representative image for a second identity (e.g., Identity 2)

Identity Assignment for a Group of New Images

After an identity database is created (e.g., using the above or another method), the techniques presented herein use clustering processes to either associate new groups of captured images with an existing identity within the identity database or to associate new groups of captured images with a new identity that is not yet present in the identity database. That is, the techniques presented herein assign the group of images either to one or more of an existing "L" identities of an identity database or to a new identity (i.e., an identity that is not yet present in the identity database).

Figure 2:
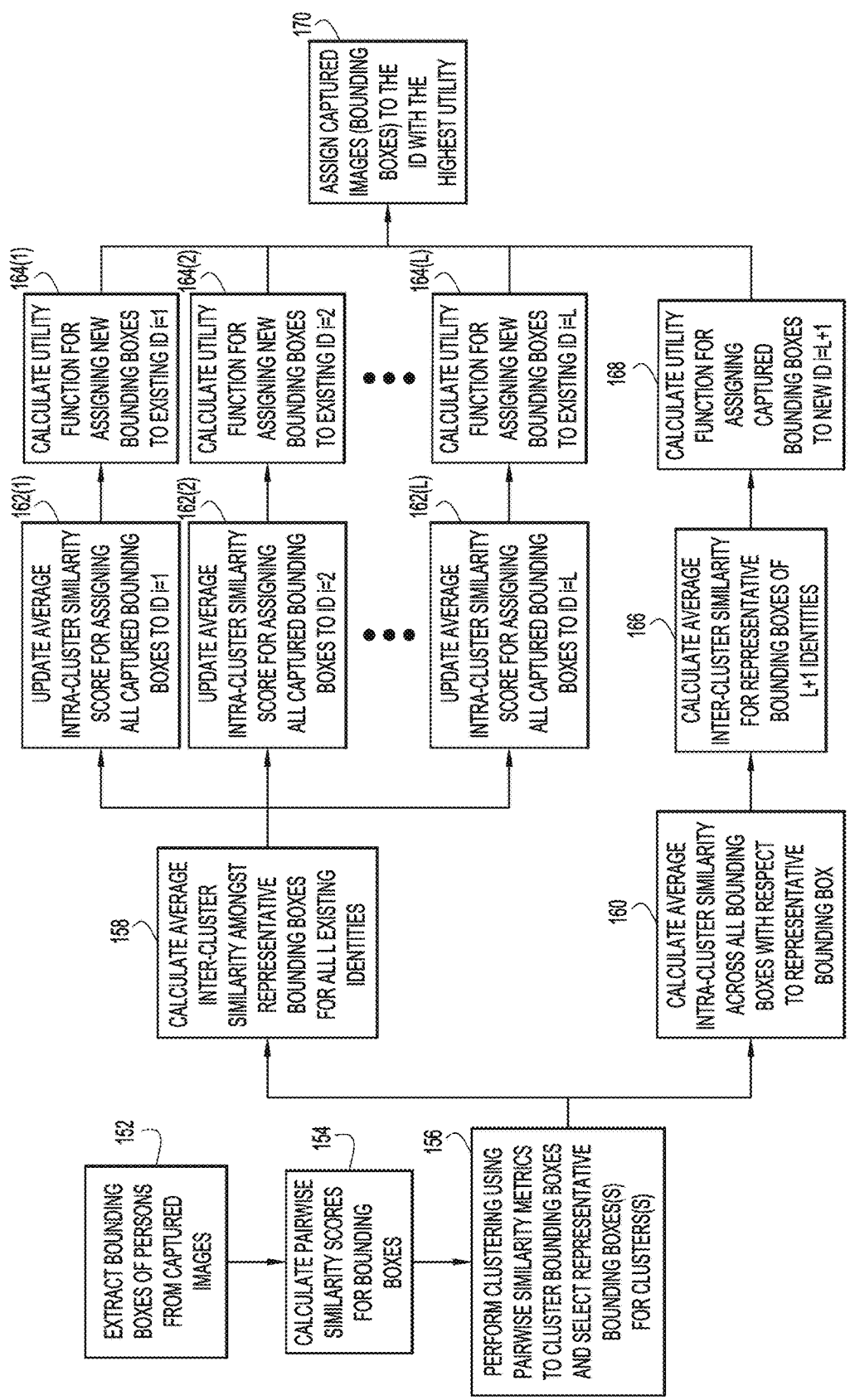
FIG. 2 is a detailed flowchart illustrating a method for assigning an identity to a group of captured images, in accordance with example embodiments presented herein.

FIG. 2 is a detailed flowchart illustrating a method 150 for assigning an identity to a group of captured images (i.e., a "captured image group"). Method 150 begins at 152 where bounding boxes of persons are extracted from the captured images. As used herein, "bounding boxes" refer to images, or portions of images, that include or otherwise represent the image of a person. At 154, relational metrics are calculated for the bounding boxes extracted from each image, namely between new images and between new and existing images (e.g., calculate relational metrics between incoming and existing bounding boxes extracted from the grouped images). In the example of FIG. 2, the relational metrics are pairwise similarity metrics that are calculated for each pair of bounding boxes. More specifically, for N existing images and M new images, the techniques presented herein augment the original N×N matrix containing relational metrics (similarity scores) to the new (N+M)×(N+M) matrix, adding 2N*M+M*M new relational metrics (similarity scores).

At 156, the pairwise similarity metrics are used in a clustering process to "cluster" the bounding boxes with one another (i.e., determine how best to cluster the (images) with one another). As noted above, the result is one or more clusters, where each cluster indicates a different person having a different identity. The clustering process also selects or otherwise determines a representative bounding box for each cluster. For ease of illustration, it is assumed the clustering process at 156 of FIG. 2 clusters all of the bounding boxes together in a single cluster (i.e., the captured images are associated with the same person). As such, in the example of FIG. 2, the bounding boxes collectively comprising a single cluster. In one example, the bounding box that has the highest average similarity score to all other bounding boxes in the cluster is selected as the representative bounding box for the cluster.

After the clustering process, two series of operations are initiated at 158 and 160. The first series of operations begins at 158 and, as described further below, includes the operations at 162(1)-162(L) and the operations at 164(1)-164(L). The second series of operations begins at 160 and, as described further below, includes the operations at 166 and the operations at 168. The process ends at 170. In general, the operations from 158, 162(1)-162(L), 164(1)-164(L), 160, 166, 168, and 170 describe how each cluster or sub-group of images that have been identified by the clustering process as belonging to the same identity (ID) (either new or existing) are processed. It is to be appreciated that the operations from 158, 162(1)-162(L), 164(1)-164(L), 160, 166, 168, and 170 are repeated for each cluster of images.

Referring first to the first series of operations, at 158 an "average inter-cluster similarity" between the group of images within the cluster and each of the "L" existing identities in the identity database is calculated. That is, an average inter-cluster similarity is calculated between the representative bounding box for the group of captured images (the cluster) and a representative image for each of the L identities. The result at 158 is the calculation of L average inter-cluster similarity scores that each relate the group of captured images to one of the L identities.

After 158, at 162(1)-162(L), the L average intra-cluster similarity scores are updated. The scores in blocks 162(1)-(L) are relate to average intra-cluster similarity because assigning an additional group of, for example, "M" new images to an existing ID will change the average intra-cluster similarity score for that i-th ID (instead of averaging over the original K_i images assigned to the ID, the process now averages over K_i+M' images including all the new ones). Accordingly, the average intra-cluster similarity score across all L clusters will also need to be updated. For example, at 162(1) the average intra-cluster similarity scores are updated for assigning all new bounding boxes to ID i=1, at 162(2) the average intra-cluster similarity scores are updated for assigning all new bounding boxes to ID i=2, and so on. The result is L updated average intra-cluster similarity scores.

At 164(1)-164(L), utility functions are calculated for assigning the new bounding boxes to each of the existing identifies (i.e., utility functions are calculated for each of the updated average intra-cluster similarity scores determined at 162(1)-162(L)). For example, at 164(1) a utility function is calculated for assigning all new bounding boxes to ID i=1 at 162(1), at 164(2) a utility function is calculated for assigning all new bounding boxes to ID i=2 at 162(2), and so on. The result is the calculation of L utility functions (utilities).

FIG. 3A is a schematic diagram illustrating one example for the calculation of a utility function when assigning captured (new) images to an existing identity. In this example, the similarity score between image k and representative image $k^*\_i$ for the i-th identity (ID) is given as:

$$s_{k,k_i^*}$$

The average intra-cluster similarity for the assigned identity i is given as:

$$s_i = \frac{1}{K_i + M} \sum_{k=1}^{K_i+M} s_{k,k_i^*}$$

The average intra-cluster similarity for the unassigned identity j is given as:

$$s_j = \frac{1}{K_j} \sum_{k=1}^{K_j} s_{k,k_j^*}$$

The average intra-cluster similarity for all L identities is given as:

$$S_{intra} = \frac{1}{L} \sum_{i=1}^{L} s_i$$

The average inter-cluster similarity for all L identities is given as:

$$S_{inter} = \frac{2}{L(L-1)} \sum_{i=1}^{L} \sum_{j=1}^{i-1} s_{k_i^*,k_j^*}$$

As such, the utility score for a given assignment is:

$$U = S_{intra} - S_{inter}$$

In certain examples, the utility function can be more general. For instance, the utility function may include a weight for the average inter-cluster similarity ($S_{inter}$), in the form of:

$$U = S_{intra} - wS_{inter},$$

where w is a weighting coefficient.

Returning to the example of FIG. 2, as noted above, after the clustering process, first and second series of operations are initiated at 158 and 160, respectively. Referring next to the second series of operations, 160 an "average intra-cluster similarity" across all of the newly captured bounding boxes is calculated with respective to the representative bounding box. The average intra-cluster similarity is the average of the similarly scores between each of the bounding boxes and the representative bounding box.

The operations at 160, 166, and 168 are executed to consider the option of assigning the group of new images as a new ID (L+1, given L existing IDs). As such, the average inter-cluster similarity corresponds to the average pairwise similarity scores of the L+1 representative images for each cluster, where L of them are from the existing image gallery and the (L+1)-th one is the representative image of the new group of images.

At 166, the average inter-cluster similarity for representative bounding boxes for all L+1 identities is calculated. The average intra-cluster similarity score corresponds to calculating the average intra-cluster similarity score s_{L+1} for the new (L+1) ID, and then averaging that along with all L existing average intra-cluster similarity scores s_i for i=1, . . . , L. At 168, a utility function is calculated for assigning the new bounding boxes to ID i=L+1.

Figure 3B:
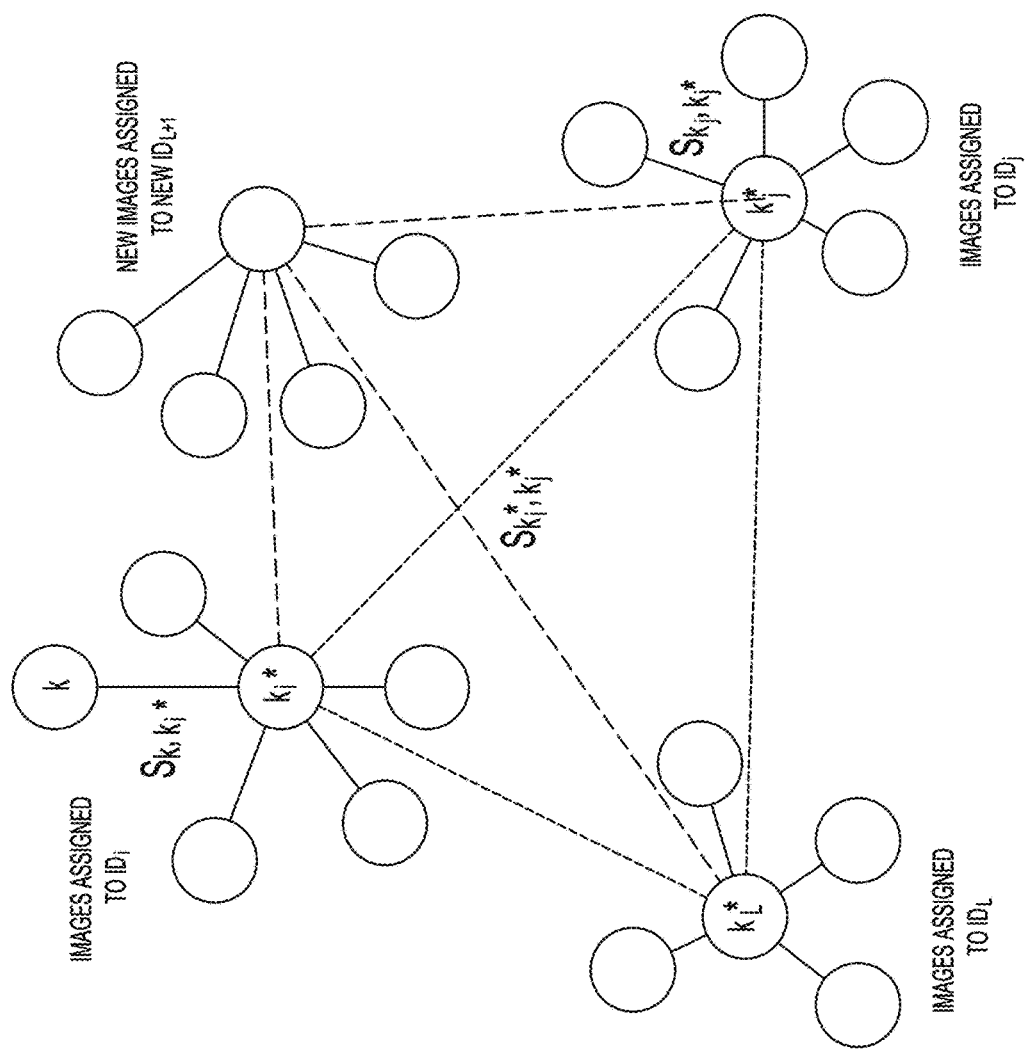
FIG. 3B is a schematic diagram illustrating the calculation of an example utility function when assigning captured images to a new identity, in accordance with example embodiments presented herein.

FIG. 3B is a schematic diagram illustrating one example for the calculation of a utility function when assigning new images to a new identity. In this example, the similarity score between image k and representative image k*_i for the i-th identity (ID) is again given as:

$$s_{k,k_i^*}$$

The average intra-cluster similarity for the i-th ID, including i=1, L+1, is given as:

$$s_i = \frac{1}{K_i} \sum_{k=1}^{K_i} s_{k,k_i^*}$$

The average intra-cluster similarity for all L+1 identities is given as:

$$S_{intra} = \frac{1}{L+1} \sum_{i=1}^{L+1} s_i$$

The average inter-cluster similarity for all L+1 identities is given as:

$$S_{inter} = \frac{2}{L(L+1)} \sum_{i=1}^{L+1} \sum_{j=1}^{i-1} s_{k_i^*,k_j^*}$$

As such, the utility score for a given assignment is:

$$U = S_{intra} - S_{inter}$$

Again, as noted, the utility function can be more general and may include a weight for the average inter-cluster similarity ($S_{inter}$), in the form of:

$$U = S_{intra} - wS_{inter},$$

where w is a weighting coefficient.

Again returning to the example of FIG. 2, at 170, the utilities calculated at 164(1)-164(L) and 168 are used to assign/associate the captured group of images (e.g., the bounding boxes) to the identity with the highest utility. If one of the utilities calculated at 164(1)-164(L) are the highest, then the captured group of images are assigned to one of the L existing identities in the identity database. If the utility calculated at 168 is highest, then the captured group of images are assigned to a new (additional) identity that is not yet present in the identity database. That is, an additional identity is created and added to the identity database using at least a sample image obtained from captured group of images.

After the captured group of images are assigned to an identity, at least one sample image associated with each of the one or more clusters is stored in the identity database (e.g., at a memory location corresponding to the identity with which the images have been associated). In one example, the representative image is stored, while in other examples multiple images are stored.

Simultaneous Assignment of Multiple Identities to a Group of New Images Based on Co-Occurrence Probabilities In certain instances, multiple persons may be detected in the same video frame (e.g., in videos captured at a busy train station). It is advantageous to make a holistic decision of identity assignment based on both the similarity features between individual image probes and their co-occurrence probability within the same video frame.

For instance, FIG. 1A illustrates a track 135 for a person B that also moves through region 100 from location 136 to location 138. If persons A and B are observed from previous images to always appear in the same video frames, then if a new probe image contains person A, then there is a higher probability that the other person in the image/frame is person B. Alternatively, if person A is not in the image, then there is a lower probability that person B is in the image. If there are L identities, one example utilizes an L×L co-occurrence matrix which describes the observed probability of person i and person j both being in the image (i is row, j is column, and matrix entry (i,j) contains the probability).

One goal of clustering is to create "clusters" of identities such that the inter-cluster similarity is very low (i.e., the clusters are "far" apart). The additional side information provided by the co-occurrence probabilities/likelihoods enables the ability to track when multiple identities appear together in captured images in order to improve the probability of identifying each of these identities.

At time t, given M new image probes that potentially correspond to multiple identities, co-occurrence of these image are encoded in the form of a binary matrix, where the entry I(i,j) is a binary indicator which encodes whether images (bounding boxes) i and j belong to the same frame. A candidate identity assignment decision can be encoded as an M×(L+1) binary matrix with entry (i,j) corresponding to assigning the i-th image probe to the j-th identity. This candidate identity assignment decision is then evaluated with a new utility function that also captures the likelihood of observed image co-occurrences given the co-occurrence probabilities/likelihoods of known identities. Such a utility function is given as:

$$\text{Utility} = \text{Co-occurrence Likelihood} + S_{intra} - S_{inter}.$$

The first term Co-occurrence Likelihood (CL) can be expressed as:

CL=sum_{i,j} Prob. {I(i,j)|Co-occurrence probability of identities assigned to i and j where I(i,j)>0}.

In this example, the summation is over all pairs of probes in the group of M new image probes. As can be seen, the value of CL depends on the identity assignment decisions. In operation, the techniques presented herein operate to choose the final identity assignment as the one that maximizes the overall utility function.

In certain examples, a more general form of the utility function allows different weighting coefficients for each term. Such a utility function is given as:

Utility=Co-occurrence Likelihood+$w1 S_{intra} - w2 S_{inter}$, where $S_{intra}$ and $S_{inter}$ are the average intra-cluster similarity and the average inter-cluster similarity, respectively, that are calculated following the set of equations for a given assignment matrix as described above. The weighting coefficients w1 and w2 are associated with the relative contribution of $S_{intra}$ and $S_{inter}$, respectively.

For example, if images i and j both belong to the same video frame (hence I(i,j)=1) and are assigned to IDs A and B, respectively, in a given assignment matrix, and A are B are known to appear together with a probability of 0.9. As such, the probability entry for (i,j) in the overall summation for CL is 0.9. However, if images i and j belong to different frames (I(i,j)=0), then the entry for (i,j) in the summation is zero.

Figure 4:
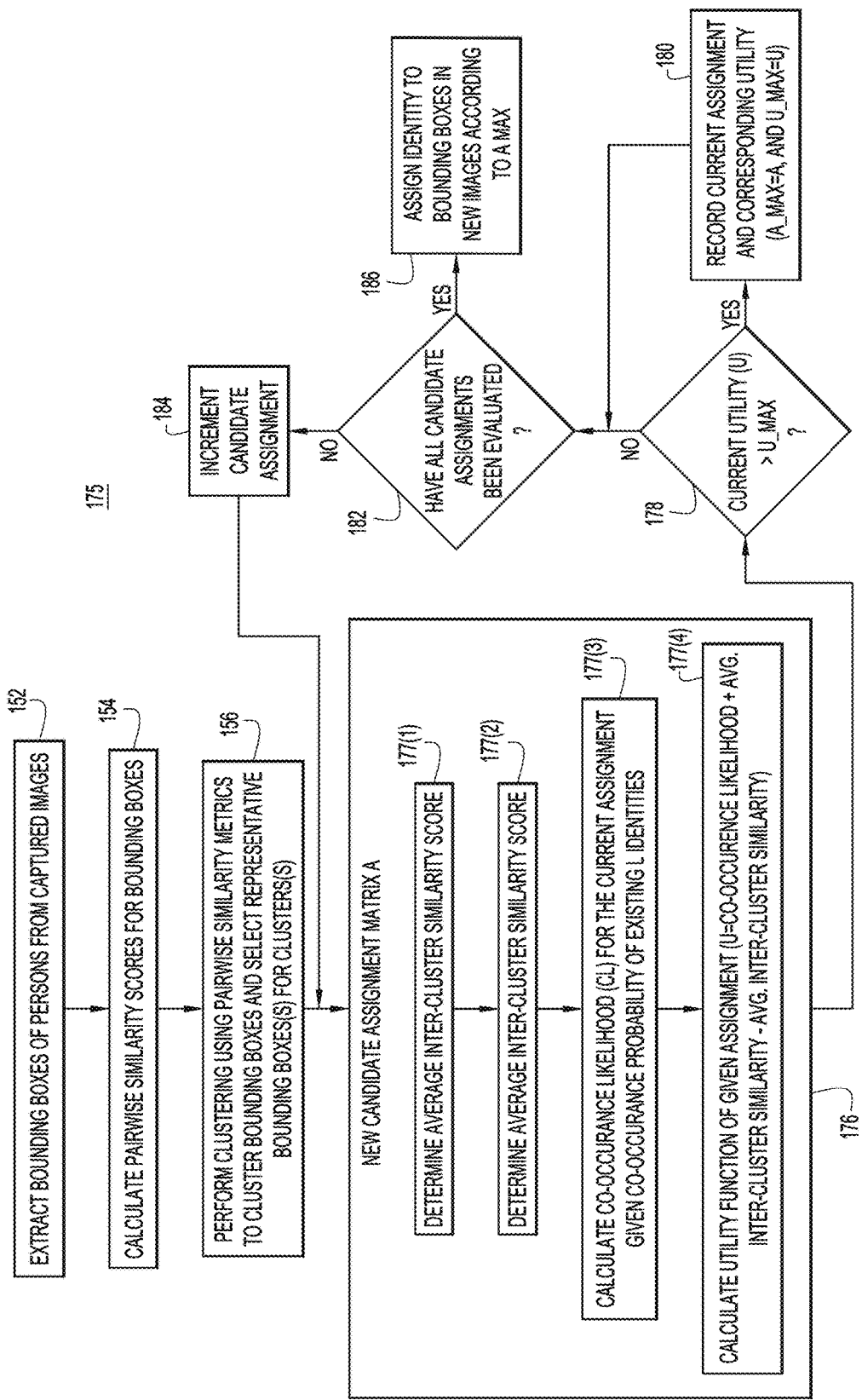
FIG. 4 is a detailed flowchart illustrating a method for simultaneous assignment of multiple identities to a group of captured images, in accordance with example embodiments presented herein.

FIG. 4 is a detailed flowchart illustrating a method 175 for simultaneous assignment of multiple identities to a group of captured images (i.e., a "captured image group"). Method 175 begins at 152 where, as described above with reference to FIG. 2, bounding boxes of persons are extracted from the captured images. At 154, relational metrics are calculated for the bounding boxes extracted from each image (e.g., calculate relational metrics between incoming and existing bounding boxes extracted from the grouped images). In the example of FIG. 4, the relational metrics are pairwise similarity metrics that are calculated for each pair of bounding boxes.

At 156, the pairwise similarity metrics are used in a clustering process to "cluster" the bounding boxes with one another. As noted above, the result is one or more clusters, where each cluster indicates a different person. The clustering process also selects or otherwise determines a representative bounding box for each cluster. In the example of FIG. 4, the clustering process at 156 does not cluster all of the bounding boxes together (i.e., the captured images are associated different persons). In the example of FIG. 4, it is assumed that incoming images are pre-clustered to belong to L' (L'>1) identities.

In general, the method of FIG. 4 operates to evaluate the utility functions for all possible identity assignments (represented in the form of the binary assignment matrix) and select the one with the highest utility score. As such, after the clustering, a plurality of "candidate assignments" are iteratively evaluated, as described further below, at 176, 178, 180, 182, and 184, as needed. As used herein, a "candidate assignment" refers to a possible identity assignment and the term "current assignment" refers to the candidate assignment that is currently under evaluation (e.g., in block 176 as described below).

Referring first to 176, a candidate assignment matrix A (of size M×(L+L')) is evaluated. The matrix A represents one candidate assignment for the incoming M images belonging to L' new or existing IDs. The row corresponds to images whereas each column corresponds to an ID (L existing ones and potentially L' new ones). In the example of FIG. 4, one candidate assignment would be to assign all M new images to the existing ID of i=1. That corresponds to a matrix A with the first column full of 1's and rest of the entries as 0. In another example, an assignment that assigns all M new images to L' new IDs will result in a matrix A with the first L columns all 0, and each of the last L' columns partially (no overlapping) filled with 1's.

Without any constraints, the techniques can consider all $2^{(M*(L+L'))}$ possible values of the assignment matrix. However, if pre-clustering is performed on the existing M images, this reduces the number of viable options for the assignment matrix since all images belong to the same group will be assigned in a "block" to the same ID. That effectively reduces the number of candidate assignment matrices to $2^{(L'*(L+L'))}$.

As shown, this evaluation of 176 includes four (4) sub-blocks referred to as 177(1), 177(2), 177(3), and 177(4). At 177(1), an average inter-cluster similarity score is determined and, at 177(2), an average intra-cluster similarity score is determined. The same procedure as described above is used to calculate both the average inter-cluster similarity score and the average intra-cluster similarity score. As such, a different assignment matrix will lead to a different value of the average inter-cluster similarity score and may lead to a different value of average intra-cluster similarity score.

At 177(3), the co-occurrence likelihood (CL) is calculated for the current assignment given co-occurrence probability of existing L identities. At 177(4), the utility function of given assignment is calculated (i.e., Utility (U)=Co-occurrence Likelihood+Avg. intra-cluster similarity−Avg. inter-cluster similarity).

At 178, a determination is made as to whether or not the current utility (i.e., calculated at 177(4)) is greater than a maximum utility. If the current utility is greater than the maximum utility, then the method proceeds to 180 where the current assignment and corresponding calculated utility are recorded (A_Max=A, and U_Max=U). The method then proceeds to 182. Returning to 178, if the current utility is not greater than the maximum utility, then the method proceeds directly to 182.

At 182, a determination is made as to whether or not all candidate assignments have been evaluated. If there are candidate assignments that remain to be evaluated, the candidate assignment is incremented at 184 and the method returns to 176 where the above operations 176, 178, 180, and 182 are repeated, as needed. If it is determined at 182 that no more candidate assignments remain to be evaluated, then the method proceeds to 186 where an identity is assigned to the bounding boxes in new images according to A_Max. The final assignment corresponds to the assignment matrix A that yields the highest value in the utility function.

Method for Pruning and Updating Representative Images in Gallery

The techniques presented herein also include pruning and updating of representative images for an identity within an identity gallery. More specifically, as the database of existing identities and their corresponding assigned images grow, it is also possible to prune example images based on their pairwise similarity scores. For instance, if two image probes i and j have a high similarity score between themselves, but also similar similarity scores with respect to other images (i.e., the i-th and j-th rows of the similarity matrix contain similar values), then they can be considered as almost duplicate representations of the same identity. As a result, it is sufficient to retain only one of the images within the gallery and discard the other one. Such a process can be carried out in an iterative manner, on a periodic basis, so as to contain the total size of the gallery from growing too fast.

Example Results

Figure 5:
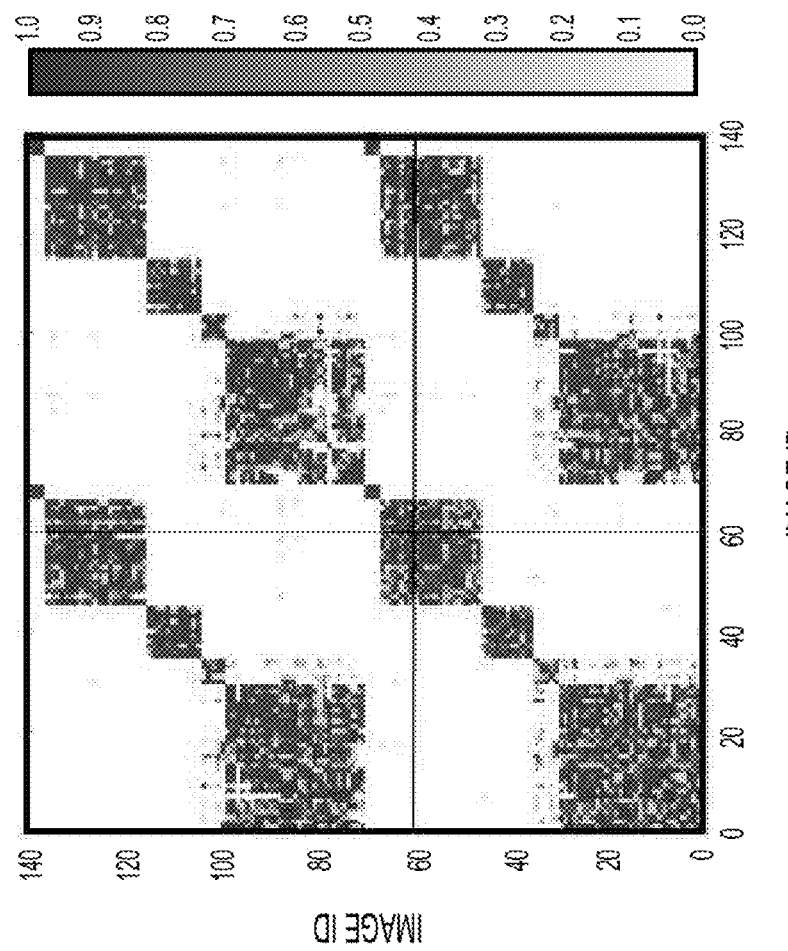
FIG. 5 is a similarity matrix generated for images from a sample image dataset, in accordance with example embodiments presented herein.
Figure 6:
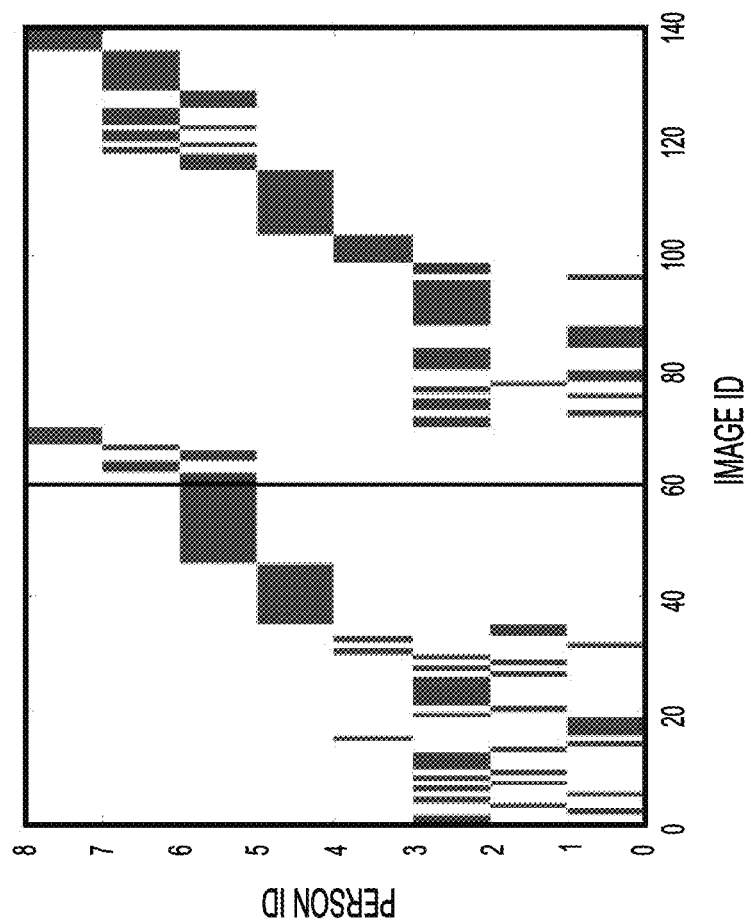
FIG. 6 is a diagram illustrating a person identity assignment from the sample dataset of FIG. 5.

FIGS. 5 and 6 illustrate results of the techniques presented herein with a sample image dataset. In the example of FIGS. 5 and 6, the initial gallery contains sixty (60) images that are pre-clustered. The additional 80 images are subsequently added and are assigned to either an existing identity (person ID) or a new identity using the techniques presented herein.

More specifically, FIG. 5 is a similarity matrix calculated for 140 images out of the sample image dataset. In general, FIG. 5 represents the pairwise similarity of the 140 images in terms of whether or not they are most likely to represent the same person. As noted above, the techniques presented herein use clustering to assign each of the 140 images to one of a number of identities. Stated differently, each of 140 images are assigned to one of the person IDs and the example starts with the initial 60×60 matrix (first 60 images). As new images are captured, the techniques presented herein are used to assign each of the images to an existing identity or a new identity that is created. FIG. 6 is a diagram illustrating the person ID assignment for 140 images out of the sample dataset forming the matrix of FIG. 5. Again, the first 60 images are assigned based on initial clustering results out of the 60×60 similarity matrix. The additional 80 images (after line 150) are assigned incrementally to either an existing person ID (e.g., image ID 080) or a new person ID (e.g., image ID 062) based on the extended similarity matrix.

Figure 7:
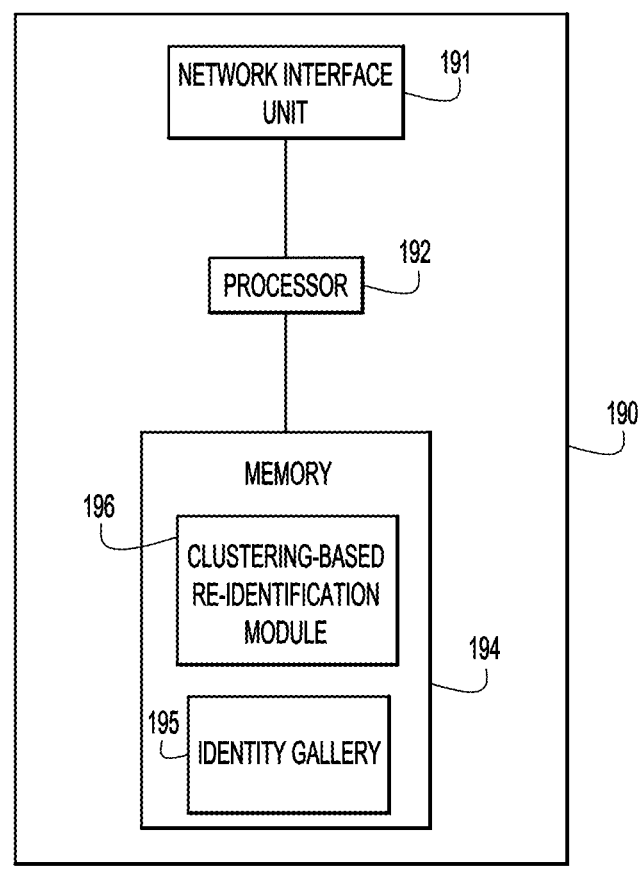
FIG. 7 is a block diagram of a computing device configured to perform person re-identification, in accordance with embodiments presented herein.

FIG. 7 is a block diagram of a computing device 190 configured for person re-identification, in accordance with embodiments presented herein. The computing device 190 includes a network interface unit 191 to enable network communications, one or more processors 192, and memory 194. The memory 194 stores an identity gallery 195 and a clustering-based re-identification module 196. The clustering-based re-identification module 196 is a software module that, when executed by the one or more processors 192, causes the one or more processors to perform the person re-identification operations described herein.

The memory 194 may include Read Only Memory (ROM), Random Access Memory (RAM), magnetic disk storage media devices, optical storage media devices, flash memory devices, electrical, optical, or other physical/tangible memory storage devices. Thus, in general, the memory 194 may comprise one or more tangible (non-transitory) computer readable storage media (e.g., a memory device) encoded with software comprising computer executable instructions and when the software is executed (by the controller) it is operable to perform the person re-identification operations described herein.

As detailed above, presented herein are person re-identification techniques for simultaneously assigning identities (existing or new/additional) to a collection of captured images. The techniques presented herein utilize relational metrics (e.g., given pairwise similarity scores) between image probes. The final identity assignment holistically considers the relative values of all candidate assignments for the collection of all probing images. As a result, it is more robust to errors/noise in the similarity scores of individual image pairs. The techniques presented herein can also accommodate useful side information such as co-occurrence probability/likelihood of recognized identities and support dynamic pruning/updating of representative image probes in the system database.

In one form, a computer implemented method is provided. The method comprises: obtaining a plurality of captured images that each include an image of at least one person; for each of the plurality of captured images, calculating relational metrics indicating a relationship between a person in a respective captured image and persons in each of the other plurality of captured images; based on the relational metrics, clustering the plurality of captured images into one or more image clusters; assigning each of the one or more image clusters to an identity of an identity database that is stored in memory of one or more computing devices; and storing at least one sample image associated with each of the one or more image clusters in the identity database.

In another form, an apparatus is provided. The apparatus comprises: one or more network interfaces; memory; and one or more processors configured to: obtain a plurality of captured images that each include an image of at least one person; for each of the plurality of captured images, calculate relational metrics indicating a relationship between a person in a respective captured image and persons in each of the other plurality of captured images; based on the relational metrics, cluster the plurality of captured images into one or more image clusters; assign each of the one or more image clusters to an identity of an identity database; and store at least one sample image associated with each of the one or more image clusters in the identity database.

In another form, one or more non-transitory computer readable storage media encoded with instructions are provided. The instructions, when executed by a processor, cause the processor to: obtain a plurality of captured images that each include an image of at least one person; for each of the plurality of captured images, calculate relational metrics indicating a relationship between a person in a respective captured image and persons in each of the other plurality of captured images; based on the relational metrics, cluster the plurality of captured images into one or more image clusters; assign each of the one or more image clusters to an identity of an identity database that is stored in memory of one or more computing devices; and store at least one sample image associated with each of the one or more image clusters in the identity database.

It is to be appreciated that the above examples are not mutually exclusive and may be combined in various arrangements. It is also to be appreciated that the above description is intended by way of example only. Various modifications and structural changes may be made therein without departing from the scope of the concepts described herein and within the scope and range of equivalents of the claims.

What is claimed is:

1. A computer-implemented method, comprising:
obtaining a plurality of captured images that each include an image of at least one person;
for each of the plurality of captured images, calculating relational metrics indicating a relationship between a person in a respective captured image and persons in each of the other plurality of captured images;
based on the relational metrics, clustering the plurality of captured images into one or more image clusters;
assigning each of the one or more image clusters to an identity of an identity database that is stored in memory of one or more computing devices, wherein assigning each of the one or more image clusters to an identity of an identity database that is stored in memory of one or more computing devices comprises simultaneously assigning each of the one or more image clusters to multiple identities based on co-occurrence probabilities; and storing at least one sample image associated with each of the one or more image clusters in the identity database.

2. The method of claim 1, wherein assigning each of the one or more image clusters to an identity of an identity database comprises:
   determining that at least one of the one or more image clusters represents an image of a person whose image has already been associated with an existing identity that is currently present in the identity database; and
   assigning the at least one of the one or more image clusters to the existing identity of the identity database.

3. The method of claim 1, wherein assigning each of the one or more image clusters to an identity of an identity database comprises:
   determining that at least one of the one or more image clusters represents an image of a person whose image has not yet been associated with an existing identity of the entity database; and
   creating an additional identity in the identity database; and
   assigning the at least one of the one or more image clusters to the additional identity of the identity database.

4. The method of claim 1, wherein the relational metrics comprise similarity scores.

5. The method of claim 1, wherein the relational metrics comprise distance scores.

6. The method of claim 1, wherein assigning each of the one or more image clusters to an identity of an identity database comprises:
   generating a plurality of utility scores for each of the one or more clusters, wherein each utility score represents a relationship between the corresponding image cluster and at least one of an existing identity that is currently present in the identity database or an additional identity not yet added to the identity database.

7. The method of claim 6, further comprising:
   generating each of the utility scores based on an average intra-cluster similarity score and an average inter-cluster similarity score that are each determined based on an assignment of the one or more image clusters to each of at least one of the existing identity and the additional identity.

8. The method of claim 1, further comprising:
   automatically pruning the number of images stored in the identity database based on one or more relational metrics computed between stored images.

9. An apparatus comprising:
   at least one network interface;
   memory; and
   one or more processors configured to:
      obtain a plurality of captured images that each include an image of at least one person;
      for each of the plurality of captured images, calculate relational metrics indicating a relationship between a person in a respective captured image and persons in each of the other plurality of captured images;
      based on the relational metrics, cluster the plurality of captured images into one or more image clusters;
      assign each of the one or more image clusters to an identity of an identity database, wherein to assign each of the one or more image clusters to an identity of an identity database, the one or more processors are configured to simultaneously assign each of the one or more image clusters to multiple identities based on co-occurrence probabilities; and
      store at least one sample image associated with each of the one or more image clusters in the identity database.

10. The apparatus of claim 9, wherein to assign each of the one or more image clusters to an identity of an identity database, the one or more processors are configured to:
    determine that at least one of the one or more image clusters represents an image of a person whose image has already been associated with an existing identity that is currently present in the identity database; and
    assign the at least one of the one or more image clusters to the existing identity of the identity database.

11. The apparatus of claim 9, wherein to assign each of the one or more image clusters to an identity of an identity database, the one or more processors are configured to:
    determine that at least one of the one or more image clusters represents an image of a person whose image has not yet been associated with an existing identity of the entity database; and
    create an additional identity in the identity database; and
    assign the at least one of the one or more image clusters to the additional identity of the identity database.

12. The apparatus of claim 9, wherein to assign each of the one or more image clusters to an identity of an identity database, the one or more processors are configured to:
    generate a plurality of utility scores for each of the one or more clusters, wherein each utility score represents a relationship between the corresponding image cluster and at least one of an existing identity that is currently present in the identity database or an additional identity not yet added to the identity database.

13. The apparatus of claim 12, wherein the one or more processors are configured to:
    generate each of the utility scores based on an average intra-cluster similarity score and an average inter-cluster similarity score that are each determined based on an assignment of the one or more image clusters to each of at least one of the existing identity and the additional identity.

14. The apparatus of claim 9, wherein the one or more processors are configured to automatically prune the number of images stored in the identity database based on one or more relational metrics computed between stored images.

15. A system comprising one or more non-transitory computer readable storage media encoded with instructions that, when executed by a processor, cause the processor to:
    obtain a plurality of captured images that each include an image of at least one person;
    for each of the plurality of captured images, calculate relational metrics indicating a relationship between a person in a respective captured image and persons in each of the other plurality of captured images;
    based on the relational metrics, cluster the plurality of captured images into one or more image clusters;
    assign each of the one or more image clusters to an identity of an identity database that is stored in memory of one or more computing devices, wherein the instructions operable to assign each of the one or more image clusters to an identity of an identity database that is stored in memory of one or more computing devices comprise instructions operable to simultaneously assign each of the one or more image clusters to multiple identities based on co-occurrence probabilities; and store at least one sample image associated with each of the one or more image clusters in the identity database.

16. The system of claim 15, wherein the instructions operable to assign each of the one or more image clusters to an identity of an identity database comprise instructions operable to:
    determine that at least one of the one or more image clusters represents an image of a person whose image has already been associated with an existing identity that is currently present in the identity database; and
    assign the at least one of the one or more image clusters to the existing identity of the identity database.

17. The system of claim 15, wherein the instructions operable to assign each of the one or more image clusters to an identity of an identity database that is stored in memory of one or more computing devices comprise instructions operable to:
    determine that at least one of the one or more image clusters represents an image of a person whose image has not yet been associated with an existing identity of the entity database; and
    create an additional identity in the identity database; and
    assign the at least one of the one or more image clusters to the additional identity of the identity database.

18. The system of claim 15, wherein the instructions operable to assign each of the one or more image clusters to an identity of an identity database that is stored in memory of one or more computing devices comprise instructions operable to generate a plurality of utility scores for each of the one or more clusters, wherein each utility score represents a relationship between the corresponding image cluster and at least one of an existing identity that is currently present in the identity database or an additional identity not yet added to the identity database.

19. The system of claim 15, wherein the instructions are operable to automatically prune the number of images stored in the identity database based on one or more relational metrics computed between stored images.

20. The system of claim 15, wherein the relation metrics comprise at least one of similarity scores or distance scores.

* * * * *